Patented Jan. 23, 1940

2,188,283

UNITED STATES PATENT OFFICE 2,188,283

RUBBER PRODUCT AND METHOD OF PRODUCING THE SAME

Frank H. Manchester, Akron, Ohio, assignor to Wingfoot Corporation, Wilmington, Del., a corporation of Delaware No Drawing. Application July 5, 1935,
Serial No. 30,011

17 Claims. (Cl. 154—40)

This invention relates to vehicle tires and other rubber products containing cellulosic material such as artificial silk to which the rubber is firmly bound by an adhesive. The invention includes the new products and the method of preparing them. Although the invention includes other rubber products such as hose, belts (such as V type fan belts and square woven conveyor belts), couplings, padding, etc. it will be described more particularly as applied to pneumatic tires in which artificial silk replaces part or all of the cotton now generally employed.

Cotton cord or fabric is now used in pneumatic tires to give them strength and to enable them to retain their shape. It is customary to friction rubber on the cotton or to dip it into a bath of latex or rubber cement and then coat rubber on it, and then build it into the tire, and when the cotton so treated is vulcanized in the tire adjacent to the rubber of the tread, etc. the rubber and cotton are firmly bound together. It has been found that in using artificial silk in tires it is desirable to use an adhesive to bond the rubber to the artificial silk and further, that with a particular type of adhesive herein described a much more satisfactory bond is secured than is possible either by frictioning or calendering rubber onto the artificial silk cords or fabrics, or by dipping the artificial silk in latex or rubber cement before bringing the rubber into contact therewith.

There are several differences between cotton and artificial silk tire carcasses any one or all of which may account for this, at least in part. One outstanding difference between cotton and artificial silk cord is the fact that the latter is formed of extruded filaments and its surface is relatively smooth compared to cotton which is covered with a fine fuzz which becomes embedded in the rubber and serves to anchor the cotton to the rubber.

Furthermore, cotton fibers are short, being ordinarily not over an inch and a half or three quarters in length, whereas the extruded artificial silk filaments may be made any length. To get strength in a cotton cord it is necessary to twist the yarn, and the fine cotton yarn used in tires, belts and the like has in the neighborhood of 20 turns per lineal inch. Such a large number of turns in an artificial silk yarn lowers its tensile strength, and only a few turns, for example three to seven per lineal inch, will ordinarily be used in tires and belts, etc. The high twist of the cotton forms crevices or openings in which the rubber becomes anchored. The loosely twisted, matted artificial silk yarn does not afford the same opportunity for anchorage of the rubber. It also seems probable that the convolutions of the cotton fiber permit a better anchorage for the rubber than the rayon fiber which is rod-like in nature.

According to this invention the rubber is cemented or secured to the artificial silk by an adhesive which contains two components, one of which forms a strong bond with the artificial silk and the other of which forms a strong bond with the rubber. These two components are firmly united, apparently by a mechanical interlocking and the rubber is by this means firmly bound to the artificial silk. Various different materials may be used as the component which forms the strong bond with the artificial silk. A protein adhesive has proved particularly satisfactory. The other component is preferably a vulcanizable material, and a natural gum latex is preferred.

The preferred material with high affinity for the artificial silk is casein. Other materials such as glue (either fish or animal), albumen, gelatin, haemoglobin, blood and the like may be used. These materials should preferably be applied in the form of water soluble compounds. A solution of such a cellulosic adhesive mixed with rubber latex forms an adhesive which, when applied to the artificial silk and dried and built into a tire and subjected to vulcanization therein adjacent to rubber (such as the rubber in the tread or in the sidewall or ply stock of the tire or the rubber forming the inner surface of the tire) forms a strong bond between the artificial silk and the rubber. The casein or other like material adheres strongly to the artificial silk. The latex is vulcanized to the rubber and forms a strong bond therewith. Apparently it is the firm adherence of the casein and latex to the artificial silk and rubber, respectively and the interlocking of the vulcanized latex with the casein which causes the strong coherence of the rubber and the artificial silk.

Casein is particularly adapted to this use not only because it adheres to the artificial silk but also because it is a good wetting and stabilizing agent and therefore penetrates into and around the filaments, yarns and plies in the artificial silk cords and gives better anchorage of the rubber in the cords than a cellulosic adhesive which is not a wetting agent.

The artificial silk extruded as a filament may be formed into cords and used in a tire as such or it may be formed into fabric and so used. However used, it is advantageously bound to the rubber by a cement of the type herein described. For example, the artificial silk may be formed into a cord and used for the plies or the breakers or flippers or the bead wrapping, etc. of a tire or these may be made of artificial silk fabric. All of the cotton may be replaced by artificial silk, or artificial silk may be used in the tire together with cotton. In one preferred type of tire artificial silk is used for the plies and the flippers, bead wrap and chafer are made of cotton, and the breaker may also be of cotton.

Artificial silk cords will usually be formed from several plies twisted from several strands of yarn each containing a large number of the extruded filaments and any fabric used will ordinarily be made from such cords. Any usual type of tire construction may be employed using rubber in the usual way except that an adhesive or cement such as herein described is used to bind the rubber to the artificial silk.

In preparing the cement the casein is preferably first brought into solution with an alkali. About 15 parts by weight of ammonium hydroxide may be used to bring 100 parts of the casein into solution. This may be done by adding about one third of the ammonia to cold water, stirring in the casein, allowing the casein to soak in the water for about three hours and then adding the rest of the ammonia. To get a smooth solution after this soaking period it may be advantageous to apply a gentle heat taking care not to exceed 160° F. This casein solution, after dilution with water if desirable, may then be stirred into the latex. With this method of procedure it is desirable to use casein which has been passed through a screen of 40 mesh or finer. Other methods of dissolving the casein may be employed. For example, it may first be ground in water and then, after adding ammonia, ground for a further period of time. The casein should not be ground for too long a period that is, until it curdles, because casein which has curdled becomes brittle on drying and flakes off of the artificial silk.

For example, 31.9 pounds of casein may be ball-milled with 318.8 pounds of water for one hour, after which 133.9 pounds of water and 19.1 pounds of concentrated ammonium hydroxide are added. This mixture is ball milled for another hour during which time the casein reacts with the ammonia forming the water soluble ammonium caseinate. At the end of this period about 134 pounds of a commercial latex of 60% rubber content are mixed with the caseinate. The casein is preferably stirred into the latex. The mixture thus obtained has approximately the following composition, the parts being given by weight:

| | Parts |
|---|---|
| Casein | 5.0 |
| Rubber hydrocarbon | 12.5 |
| Ammonium hydroxide | 3.0 |
| Water | 79.5 |

This composition may be used immediately or after standing several hours, although an extended period of standing generally decreases its adhesive properties somewhat. If left too long the mixture tends to spoil. If desired, age resisters for casein such as hydroquinone, sodium chloro phenyl phenate and sodium ortho phenyl phenate may be employed. Excess ammonia may be used for this purpose.

In making a cord tire, for example, the cords of artificial silk are immersed in this composition for a period of 30 seconds more or less after which they are dried under conditions such that the composition on drying does not form blisters on the surface of the cords. If blisters are formed, the adhesion, of course is greatly decreased. The treated cords are advantageously dried at substantially room temperature until they are dry to the touch after which super-atmospheric temperatures may be used without danger.

The time required to dry the cords at room temperature depends upon the size and construction of the cords and the nature of the composition and can best be arrived at by experimentation. It has been found good practice to heat the cords for 8-10 minutes to about 250° F., shortly before processing them with rubber in order to reduce the moisture content to a very uniform low figure. The removal of moisture may be facilitated by reduction in pressure. Any suitable method of drying may be employed which avoids blistering and reduces the moisture content to a point where no difficulty will later be experienced in vulcanizing with rubber. The cords may be dried at room temperature although this consumes too much time for factory operations. Tests made on various artificial silks treated with casein latex are tabulated below. The tested cords prepared with the various adhesives were dried under tension of approximately 100 grams in order to approximate commercial production.

In preparing the test samples the cords treated with the various adhesives were each placed between two layers of square woven fabric coated on each side with a vulcanizable rubber compound such as a loaded or pure gum carcass stock, a layer of holland approximately 3/8" wide being placed crosswise of one side of the cords on one sheet of the square woven fabric so that the cords at this section might be easily laid bare after vulcanization. Thereupon the samples were cured in a small sheet mold under conditions corresponding to that which the treated material receives in use in a tire. After being cured one face of the sheet was slit into the holland and the holland removed. Test samples, each including one cord were then cut from the sheet.

Each cord was lifted free from the rubber in the zone where the holland had been placed and the square woven fabric and vulcanized rubber in this zone were entirely cut away. The sample was then carefully incised with a knife at a point 3/8" from the cut out zone, the incision entirely severing the cord at this point. Two holes were then punched in the rubber ends of the test piece in line with the cord and the sample placed on hooks in a test apparatus. A load was applied and the cord pulled endwise from its position in the cured rubber, the adhesion value being the load in pounds necessary to pull the 3/8" test length from its vulcanized position in the test sheet.

In each of the tests the cords when initially treated were approximately 30 inches in length and maintained under a tension of 93 grams during the treating and rubberizing. The drying was done at room temperature except where the table indicates that the treated cord was immediately heated to a higher temperature. The controls, cords with which no casein latex or else latex alone was employed, are given for comparison.

| Fiber | Treatment | Number of tests | Adhesion in pounds—¾" length | Number cords broke |
|---|---|---|---|---|
| Cuprammonium silk (Furness) | Casein-latex | 4 | 17.3 | 1 |
| Do | None | 4 | 6.5 | |
| Cellulose nitrate silk | Casein-latex | 8 | 12.7 | 8 |
| Do | None | 8 | 6.2 | |
| Cuprammonium silk (Bemberg) | Casein-latex | 8 | 17.3 | 8 |
| Do | None | 8 | 6.1 | |
| Viscose rayon silk | Casein-latex | 7 | 19.6 | 6 |
| Do | None | 8 | 4.9 | |
| Do | Casein-latex heated immediately. | 8 | 11.1 | |
| Viscose rayon 20% rayon flock | None | 8 | 8.9 | |
| Do | Casein-latex | 7 | 10.2 | 7 |
| Do | Casein-latex heated immediately. | 8 | 15.9 | 8 |
| Viscose rayon | 25% latex | 16 | 9.9 | |

In the foregoing the cords in each instance were in the range of the size capable of employment in the plies of automobile tires. Unless otherwise noted the cords were twisted entirely from artificial silk filaments. Those containing flock were prepared by twisting filaments to which flock had been made to adhere.

As is readily seen from these data, the use of casein-latex greatly improves the adhesion of vulcanized rubber to artificial silk. With viscose rayon, for example, the adhesion value is increased from 4.9 pounds to more than 19.6 pounds. The treatment is especially applicable to artificial silk in filament form and the adhesion value can be raised considerably above that now obtained in tires employing cotton cords in which no adhesive is used.

Another process of preparing a casein-latex adhesive although not generally as desirable as the grinding method, may, with the proper precautions, be employed with good results by soaking in water for approximately one hour casein which has been passed through a screen of 40 mesh or finer. A dilute aqueous ammonia solution is added and sufficient latex to give a rubber content for the composition of about 18%, the casein being present as the caseinate in an amount approximating 7½%. The formation of the caseinate can be facilitated, if desired, by heating the ammonia-casein mixture. Also, it is possible to decrease the soaking time by employing superatmospheric temperatures of, for example, 60° C. Rayon cords treated with this composition and tested as above described gave an average adhesion value of 18.8 pounds and as several of the cords broke during the test, the actual adhesion was even higher than this figure.

In another test a composition containing 5% casein and 12½% rubber as latex was prepared by soaking at room temperature 5 grams of casein in 50 grams of water for 16 hours, adding slowly with stirring a mixture of 3 grams of concentrated ammonium hydroxide and 21 grams of water, and then sufficient latex to give a 12½% rubber content. The adhesion of rubber to rayon treated with this composition averaged 18.9 pounds for 8 samples. In a test on standard cotton cord a composition containing 5% casein and 12½% rubber was prepared by stirring at room temperature 5 grams of casein in 50 grams of water for one hour, adding a mixture of 3 grams of concentrated ammonium hydroxide and 21 grams of water, stirring for another hour and then adding 20.8 grams of a commercial latex of 60% rubber content. The average adhesion value for 8 tests was 20.7 pounds.

In preparing these casein-latex compositions, it is preferable to employ a medium which will make the casein soluble in water. Ammonia will generally be found to be more desirable than other materials because of its volatility. On drying, it evaporates from the cords along with the water, leaving only the casein and rubber, the casein being in its original stable form. Any other material, however, which will form a water soluble compound with casein, such as trisodium phosphate, sodium carbonate, sodium and potassium hydroxides, borax, organic amines such as triethanolamine and the like may of course be used. Calcium compounds such as lime may be used to assist in dissolving the casein. They eventually form insoluble calcium caseinate.

Insolubilizers for the casein may be employed such as formaldehyde, paraldehyde, compounds such as hexamethylene tetramine which yield formaldehyde on heating, and the like. For example, 100 parts of casein in 150 parts of water was dissolved with 15 parts of strong ammonium hydroxide. To 62.5 parts of this solution are added 246 parts of water, 107 parts of 70% rubber latex and 1.25 parts of hexamethylenetetramine (or 5 parts on 100 of casein). The latter is advantageously mixed with the casein solution before mixing the casein and latex. Insolubilizers such as formaldehyde and paraldehyde are preferably applied after the adhesive is on the cord to avoid gelling the casein in solution. The amount of hexamethylene tetramine or other insolubilizer employed may be varied and the ratio of casein and latex may be varied. Hexamethylene tetramine may inhibit rubber degradation and may also exert a protective action on the casein.

If desirable a suitable plasticizer, wetting agent, etc. may be added to prevent the casein from becoming too hard or brittle.

Whatever protein is employed, it is preferable that it be in a homogeneous aqueous solution. To obtain this with certain proteins, it is desirable to employ them in finely divided form. For instance, if the casein is not in a finely divided condition, it will not entirely react with the ammonia to give a water-soluble ammonium caseinate. With large particle size casein, the ammonia, or other water solubilizing compound, seems to form a lumpy caseinate not entirely water-soluble. For best results it has been found that the protein employed preferably should be in a substantially true aqueous solution so that the composition will uniformly penetrate and adhere to the cords or other fibrous material.

Although casein has been found to give the best and most uniform results, other proteins may be employed successfully with the latex. A number of tests made on rayon cords employing various protein-latex mixtures leads to this conclusion. In experiments on compositions containing 25% rubber in the form of latex, the cords were soaked for three minutes in the composition and then dried at room temperatures under a tension of about 93 grams, after which they were heated in a vacuum to approximately 212° F. for 15 minutes in order to remove any excess moisture. The cords were then built up into test samples as previously described, the following results being obtained:

| Protein content | Test length | Number of tests | Adhesion value in pounds |
|---|---|---|---|
| | Inches | | |
| 25% gelatin | ⅜ | 8 | 18.2 |
| 25% blood albumen | ⅜ | 7 | 18.3 |
| 1% haemoglobin | ½ | 8 | 14.0 |
| 5% dark blood | ½ | 8 | 16.2 |
| 5% Armour's glue | ½ | 8 | 17.7 |
| 5% egg white | ½ | 7 | 13.9 |
| No treatment—no latex | ½ | 16 | 8.2 |
| Latex—no protein | ⅜ | 16 | 9.9 |

It is evident from the foregoing that other proteins may be employed in conjunction with the latex to give increased adhesion values over those obtained when using only rubber latex itself. While the ground casein-latex composition perhaps gives slightly higher and more consistent adhesions between rubber and fibrous material, these other proteins may be used to advantage.

The proportions of protein to rubber in the composition may be varied within fairly wide limits. Thus in the case of casein, satisfactory adhesions have been obtained with amounts varying from three to sixty-seven percent of the rubber in the composition. One of the preferred compositions employs forty percent casein based on the rubber (5% casein and 12.5% rubber). The amount of water in the emulsion may be varied over a relatively wide range, compositions containing from seven to 25% or more of rubber and casein (based on the weight of the entire composition) having been found satisfactory. Larger amounts may be used. Any of the commercial forms of casein may be used, among them being muriatic acid coagulated caseins (low and high viscosity), rennet casein, lactic acid casein and sulfuric acid coagulated caseins (medium and high viscosity).

Various forms of rubber may be used. Natural latex (stabilized in a usual way) is satisfactory. A concentrated form of latex, such as that known to the trade as Revertex may be used. Casein with a water dispersion of rubber gives materially better adhesion of rubber to artificial silk than when no adhesive is used and is entirely satisfactory for certain purposes.

Vulcanizing ingredients may be compounded with latex in carrying out the invention. For instance, sulfur, an accelerating agent, ZnO, etc. may be thoroughly mixed into the latex before it is mixed with the casein or component having a strong affinity for the artificial silk. Sulfur alone or an accelerating agent alone may be used as there is migration of vulcanizing ingredients from the rubber into the bonding layer. Vulcanizing ingredients may be employed with casein, glue and other components having a strong affinity for the artificial silk. They may be used with casein and an insolubilizer for the casein.

This application is in part a continuation of copending application Serial No. 655,248 filed February 4, 1933.

I claim:

1. In an article of manufacture which comprises rubber vulcanized to artificial silk, an adhesive between the artificial silk and the rubber which comprises a casein adhesive and rubber deposited from latex.

2. In a tire which comprises artificial silk, between the artificial silk and the rubber of the tire an adhesive bond which comprises insolubilized casein and rubber deposited from latex.

3. The method of forming an article which comprises interposing between artificial silk and rubber compounded with vulcanizing ingredients, an adhesive which comprises a casein adhesive and a vulcanizable rubber material, and then subjecting the whole to vulcanization.

4. In the manufacture of a tire which comprises artificial silk, the steps of interposing a casein adhesive and latex between the artificial silk and a vulcanizable rubber mix and then subjecting the whole to vulcanization temperature.

5. In the manufacture of a tire which comprises artificial silk, the steps which comprise applying to the artificial silk an adhesive which comprises a casein adhesive and latex, and after drying applying a vulcanizable rubber mix thereto and subjecting the whole to vulcanization temperature.

6. In the manufacture of a tire which comprises artificial silk, the steps of treating the artificial silk with casein and latex and thereafter vulcanizing rubber in pressure contact with the treated artificial silk.

7. In the manufacture of a tire which comprises artificial silk, the steps which comprise affixing insolubilized casein to the artificial silk, anchoring latex in the insolubilized casein and vulcanizing the latex in pressure contact with a vulcanizable rubber mix.

8. In the manufacture of a tire which comprises artificial silk, the steps which comprise affixing casein to the artificial silk, insolubilizing the casein in the presence of latex so the latex is anchored in insolubilized casein and vulcanizing the latex in pressure contact with a vulcanizable rubber mix.

9. In the manufacture of a tire which comprises artificial silk, the steps which comprise applying latex, casein and hexamethylene tetramine to the silk, superimposing a vulcanizable rubber mix thereon and thereafter subjecting the whole to vulcanization.

10. A process for improving the bond between rubber and artificial silk cords which comprises subjecting the cords to an aqueous ammoniacal composition containing rubber hydrocarbon and casein in an amount varying from approximately 20 percent to 70 percent of the rubber content, eliminating the water and ammonia from the cords, coating these treated cords with a vulcanizable rubber compound and vulcanizing.

11. A process for improving the bond between rubber and cords twisted from artificial silk filaments which comprises treating the cords with an aqueous alkaline composition containing rubber and a water soluble compound of casein obtained from finely divided casein, eliminating the liquid from the cord, associating said cords with a vulcanizable rubber compound, and vulcanizing the composite article.

12. A process for improving the bond between vulcanized rubber and artificial silk tire cords which comprises dipping said cords at room temperatures in a composition of the following approximate proportions by weight:

| | Parts |
|---|---|
| Casein | 5.0 |
| Rubber hydrocarbon | 12.5 |
| Ammonium hydroxide | 3.0 |
| Water | 79.5 | partially drying said cords at room temperature; substantially completing the drying at superatmospheric temperatures; associating said cords with a vulcanizable rubber compound, and vulcanizing the composite structure.

13. A process for treating artificial silk cords which comprises dipping them in an aqueous casein-latex composition, the casein being in a finely divided dispersion and in an amount varying from 20% to 70% of the rubber in the latex, eliminating the water from the cords, associating therewith a vulcanizable rubber compound, and vulcanizing.

14. A process for bonding vulcanized rubber to artificial silk cords which comprises coating the cords with an aqueous ammoniacal casein-latex composition at room temperature, the casein being in a water soluble form and in an amount varying from 20% to 70% of the rubber in the latex, drying the cords at substantially room temperatures, associating said cords with a vulcanizable rubber compound, and vulcanizing the composite mass.

15. A bonded composite material comprising an artificial silk cord embedded in vulcanized rubber, and casein and rubber deposited from latex as a bond between the cord and the rubber.

16. A bonded composite material comprising a cord twisted from artificial silk filaments embedded in vulcanized rubber, and a casein-rubber composition forming a bond between the cord and the rubber.

17. A process for improving the bond between rubber and artificial silk cords which comprises subjecting the cords to an aqueous ammoniacal composition containing rubber hydrocarbon and casein in an amount varying from approximately 20 percent to 70 percent of the rubber content, eliminating the water from the cords by drying under conditions which involve a starting temperature of approximately room temperature, coating these treated cords with a vulcanizable rubber compound and vulcanizing.

FRANK H. MANCHESTER.